United States Patent
Berroteran et al.

(10) Patent No.: US 11,682,990 B2
(45) Date of Patent: Jun. 20, 2023

(54) SYSTEM AND METHOD FOR DYNAMICALLY ESTIMATING ACTIVE POWER CAPABILITY OF AN INVERTER-BASED RESOURCE

(71) Applicant: General Electric Renovables Espana, S.L., Barcelona (ES)

(72) Inventors: Igor Berroteran, Salem, VA (US); Enno Ubben, Steinfurt (DE)

(73) Assignee: General Electric Renovables Espana, S.L., Barcelona (ES)

( * ) Notice: Subject to any disclaimer, the term of this patent is extended or adjusted under 35 U.S.C. 154(b) by 0 days.

(21) Appl. No.: 17/511,903

(22) Filed: Oct. 27, 2021

(65) Prior Publication Data
US 2023/0125298 A1 Apr. 27, 2023

(51) Int. Cl.
*H02P 9/02* (2006.01)
*H02J 3/38* (2006.01)
*H02M 7/44* (2006.01)

(52) U.S. Cl.
CPC .............. *H02P 9/02* (2013.01); *H02J 3/381* (2013.01); *H02M 7/44* (2013.01); *H02J 2300/28* (2020.01)

(58) Field of Classification Search
CPC ................... H02P 9/02; H02M 7/44
See application file for complete search history.

(56) References Cited

U.S. PATENT DOCUMENTS

| | | |
|---|---|---|
| 2008/0252076 A1 | 10/2008 | Fortmann et al. |
| 2010/0145533 A1 | 6/2010 | Cardinal et al. |
| 2013/0076327 A1 | 3/2013 | Wagoner et al. |
| 2016/0226252 A1 | 8/2016 | Kravtiz et al. |

FOREIGN PATENT DOCUMENTS

| | | |
|---|---|---|
| EP | 1919076 A2 | 5/2008 |
| WO | WO 2019/199806 A1 | 10/2019 |

OTHER PUBLICATIONS

The EP Search Report for EP application No. 22198488.3, dated Apr. 6, 2023, 9 pages.

*Primary Examiner* — Sean Gugger
(74) *Attorney, Agent, or Firm* — Dority & Manning, P.A.

(57) ABSTRACT

A method for controlling an inverter-based resource (IBR) having a power converter and a generator connected to an electrical grid includes determining an available active power of the electrical grid. The method also includes determining an available active power of the IBR based on an effect of a speed and a rating of the generator. Further, the method includes determining a minimum available active power based on the available active power of the electrical grid and the available active power of the IBR. Moreover, the method includes determining an active power limit change for the IBR based on one or more thermal margins of the IBR. In addition, the method includes determining an active power estimation as a function of the minimum available active power and the active power limit change. The method further includes providing the active power estimation to a supervisory controller for controlling the IBR.

19 Claims, 11 Drawing Sheets

SYSTEM AND METHOD FOR DYNAMICALLY ESTIMATING ACTIVE POWER CAPABILITY OF AN INVERTER-BASED RESOURCE

FIELD

The present disclosure relates generally inverter-based resources and, more particularly, to systems and methods for dynamically estimating active power capability of inverter-based resources.

BACKGROUND

Wind power is considered one of the cleanest, most environmentally friendly energy sources presently available and wind turbines have gained increased attention in this regard. A modern wind turbine typically includes a tower, a generator, a gearbox, a nacelle, and one or more rotor blades. The rotor blades are the primary elements for converting wind energy into electrical energy. The blades typically have the cross-sectional profile of an airfoil such that, during operation, air flows over the blade producing a pressure difference between its sides. Consequently, a lift force, which is directed from the pressure side towards the suction side, acts on the blade. The lift force generates torque on the main rotor shaft, which is connected to a generator for producing electricity that is transferred to a power grid. The power grid transmits electrical energy from generating facilities to end users.

Wind power generation is typically provided by a wind farm, which contains a plurality of wind turbine generators (e.g., often 100 or more wind turbines). Typical wind farms have a farm-level controller that regulates the voltage, reactive power, and/or power factor at the wind farm interconnection point (i.e., the point at which the local wind turbine generators are connected to the grid; may also be referred to as a point of common coupling (PCC)). Thus, typical wind farm control strategies include meeting a power demand at the PCC.

Having accurate knowledge of aggregated wind farm power capability, by receiving dynamically adjusted levels from each wind turbine, is then desirable to better allocate connection and disconnection of units in order to match demand. Accordingly, the present disclosure is directed to systems and methods for dynamically estimating active power capability of each wind turbine in the wind farm that changes/updates as wind turbine configurations and/or operating conditions change.

BRIEF DESCRIPTION

Aspects and advantages of the invention will be set forth in part in the following description, or may be obvious from the description, or may be learned through practice of the invention.

In one aspect, the present disclosure is directed to a method for controlling an inverter-based resource connected to an electrical grid. The inverter-based resource has a power converter. The method includes determining, via a controller of the inverter-based resource, an available active power of the electrical grid. The method also includes determining, via the controller, an available active power of the inverter-based resource based on an effect of a speed and a rating of the generator. Further, the method includes determining, via the controller, a minimum available active power based on the available active power of the electrical grid and the available active power of the inverter-based resource. Moreover, the method includes determining, via the controller, an active power limit change for the inverter-based resource based on one or more thermal margins of the inverter-based resource. In addition, the method includes determining, via the controller, an active power estimation as a function of the minimum available active power and the active power limit change. Thus, the method further includes providing the active power estimation to a supervisory controller for controlling the inverter-based resource.

In an embodiment, determining the available active power of the electrical grid may include receiving, via a controller of the inverter-based resource, a voltage magnitude from the electrical grid and applying, via the controller, a power limiter to the voltage magnitude to determine an available active power of the electrical grid.

In another embodiment, determining the available active power of the inverter-based resource based on the effect of at least one of the speed and the rating of the generator may include receiving, via the controller, a plurality of operating parameters of the generator relating to at least one of the speed and the rating of the generator and determining the available active power of the inverter-based resource as a function of the plurality of operating parameters of the generator. In such embodiments, the plurality of operating parameters of the generator may include, for example, rotor speed, generator speed, a name plate rated watts, a rated torque, an allowed overload, or combinations thereof.

In further embodiments, determining the minimum available active power based on the available active power of the electrical grid and the available active power of the inverter-based resource may include receiving the available active power of the electrical grid and the available active power of the inverter-based resource via a comparator and selecting a lower of the available active power of the electrical grid or the available active power of the inverter-based resource.

In additional embodiments, determining the active power limit change for the inverter-based resource based on one or more thermal margins of the inverter-based resource may include receiving, via the controller, a plurality of operating parameters relating to at least one of the speed and derating of the generator, determining, via the controller, a time-over-current thermal margin for one or more components of the inverter-based resource using the plurality of operating parameters, and determining, via the controller, the active power limit change for the inverter-based resource based on the time-over-current thermal margin for the one or more components of the inverter-based resource. In such embodiments, the plurality of operating parameters may include, for example, rotor speed, generator speed, an allowed overload, or combinations thereof.

In several embodiments, the method may include determining whether a torque command of the generator can be modified based on the minimum available active power. For example, in an embodiment, determining whether the torque command of the generator can be modified based on the minimum available active power may include receiving a torque command limit of the generator and a power feedback estimation of the electrical grid and determining, via the controller, an effect of the torque command in limit imposed by a voltage and the rating of the generator.

In another embodiment, the method may include filtering, via a filtering assembly of the controller, the active power estimation. For example, in an embodiment, the method may include receiving, via the filtering assembly of the controller, an operating state of a rotor bridge of the power converter and ensuring the operating state is running before determining the active power estimation.

In further embodiments, the inverter-based resource may be part of a power plant having a plurality of inverter-based resources. Thus, in an embodiment, the power plant may be controlled by the supervisory controller. In particular embodiments, the inverter-based resource may include a wind turbine and the power plant may be a wind farm.

In certain embodiments, the method may further include determining an active power estimation as a function of the minimum available active power and the active power limit change for each of the plurality of inverter-based resources, providing the active power estimations for each of the plurality of inverter-based resources to the supervisory controller, and tailoring, via the supervisory controller, commands the plurality of inverter-based resources based on the active power estimations.

In particular embodiments, the method may also include determining, via the controller, an apparent power estimation as a function of the active power estimation and a reactive power of the inverter-based resource.

In another aspect, the present disclosure is directed to a method for controlling an inverter-based resource connected to an electrical grid. The inverter-based resource has a generator and a power converter. The method includes determining, via a controller of the inverter-based resource, an active power capability as a function of an electromechanical rating of the inverter-based resource, a grid voltage of the electrical grid, a speed of the generator, and a thermal derating of the inverter-based resource. The method also includes providing the active power capability to a supervisory controller for controlling the inverter-based resource.

In yet another aspect, the present disclosure is directed to a system for controlling an inverter-based resource connected to an electrical grid. The inverter-based resource has a generator and a power converter. The system includes a supervisory controller and a local controller communicatively coupled to the supervisory controller. The local controller is configured to perform a plurality of operations, including but not limited to determining an available active power of the electrical grid, determining an available active power of the inverter-based resource based on an effect of a speed and a rating of the generator, determining a minimum available active power based on the available active power of the electrical grid and the available active power of the inverter-based resource, determining an active power limit change for the inverter-based resource based on one or more thermal margins of the inverter-based resource, determining an active power estimation as a function of the minimum available active power and the active power limit change, and providing the active power estimation to a supervisory controller for controlling the inverter-based resource. It should be understood that the system may further include any additional features and/or embodiments described herein.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
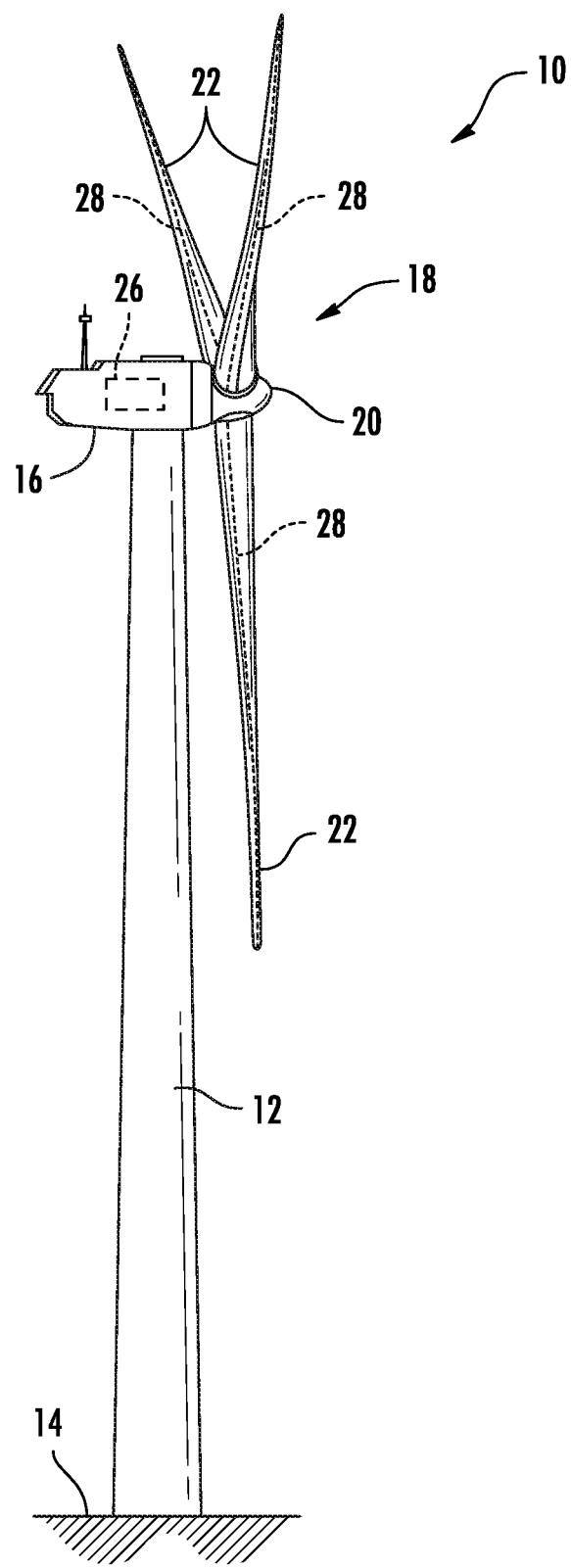
FIG. 1 illustrates a perspective view of one embodiment of a wind turbine according to the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally, the present disclosure is directed to systems and methods for dynamically estimating active power capability of inverter-based resources. In particular, the method includes determining an active power capability as a function of an inverter-based resource using the following technical considerations: an electromechanical rating of the inverter-based resource, a grid voltage of the electrical grid, a speed of the generator, and/or a thermal derating of the inverter-based resource. The method also includes providing the active power capability to a supervisory controller for controlling an overall power plant.

Although the present technology described herein is explained with reference to a wind farm having a plurality of wind turbine generators, it should be understood that the present technology may also be implemented for any suitable application having the ability to generate power. As used herein, inverter-based resources generally refer to electrical devices that can generate or absorb electric power through switching of power-electronic devices. Accordingly, inverter-based resource may include wind turbine generators, solar inverters, energy-storage systems, STATCOMs, or hydro-power systems.

Referring now to the drawings, FIG. 1 illustrates a perspective view of one embodiment of a wind turbine 10 according to the present disclosure. As shown, the wind turbine 10 generally includes a tower 12 extending from a support surface 14, a nacelle 16 mounted on the tower 12, and a rotor 18 coupled to the nacelle 16. The rotor 18 includes a rotatable hub 20 and at least one rotor blade 22 coupled to and extending outwardly from the hub 20. For example, in the illustrated embodiment, the rotor 18 includes three rotor blades 22. However, in an alternative embodiment, the rotor 18 may include more or less than three rotor blades 22. Each rotor blade 22 may be spaced about the hub 20 to facilitate rotating the rotor 18 to enable kinetic energy to be transferred from the wind into usable mechanical energy, and subsequently, electrical energy. For instance, the hub 20 may be rotatably coupled to an electric generator 24 (FIG. 1) positioned within the nacelle 16 to permit electrical energy to be produced.

The wind turbine 10 may also include a wind turbine controller 26 centralized within the nacelle 16. However, in other embodiments, the controller 26 may be located within any other component of the wind turbine 10 or at a location outside the wind turbine 10. Further, the controller 26 may be communicatively coupled to any number of the components of the wind turbine 10 in order to control the operation of such components and/or implement a corrective or control action. As such, the controller 26 may include a computer or other suitable processing unit. Thus, in several embodiments, the controller 26 may include suitable computer-readable instructions that, when implemented, configure the controller 26 to perform various different functions, such as receiving, transmitting and/or executing wind turbine control signals. Accordingly, the controller 26 may generally be configured to control the various operating modes (e.g., start-up or shut-down sequences), de-rating or up-rating the wind turbine, and/or individual components of the wind turbine 10.

Figure 2:
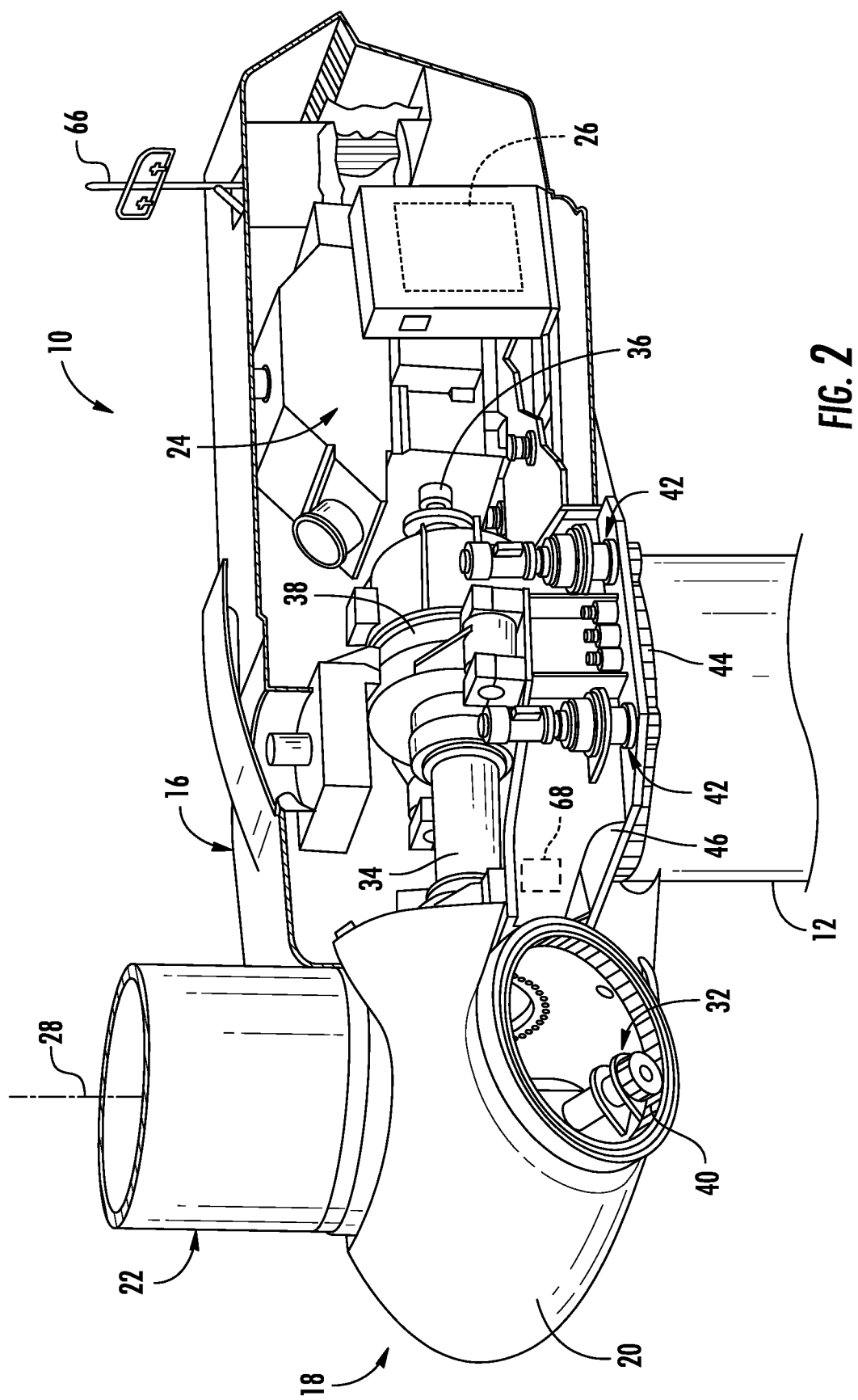
FIG. 2 illustrates a simplified, internal view of one embodiment of a nacelle according to the present disclosure.
Figure 4:
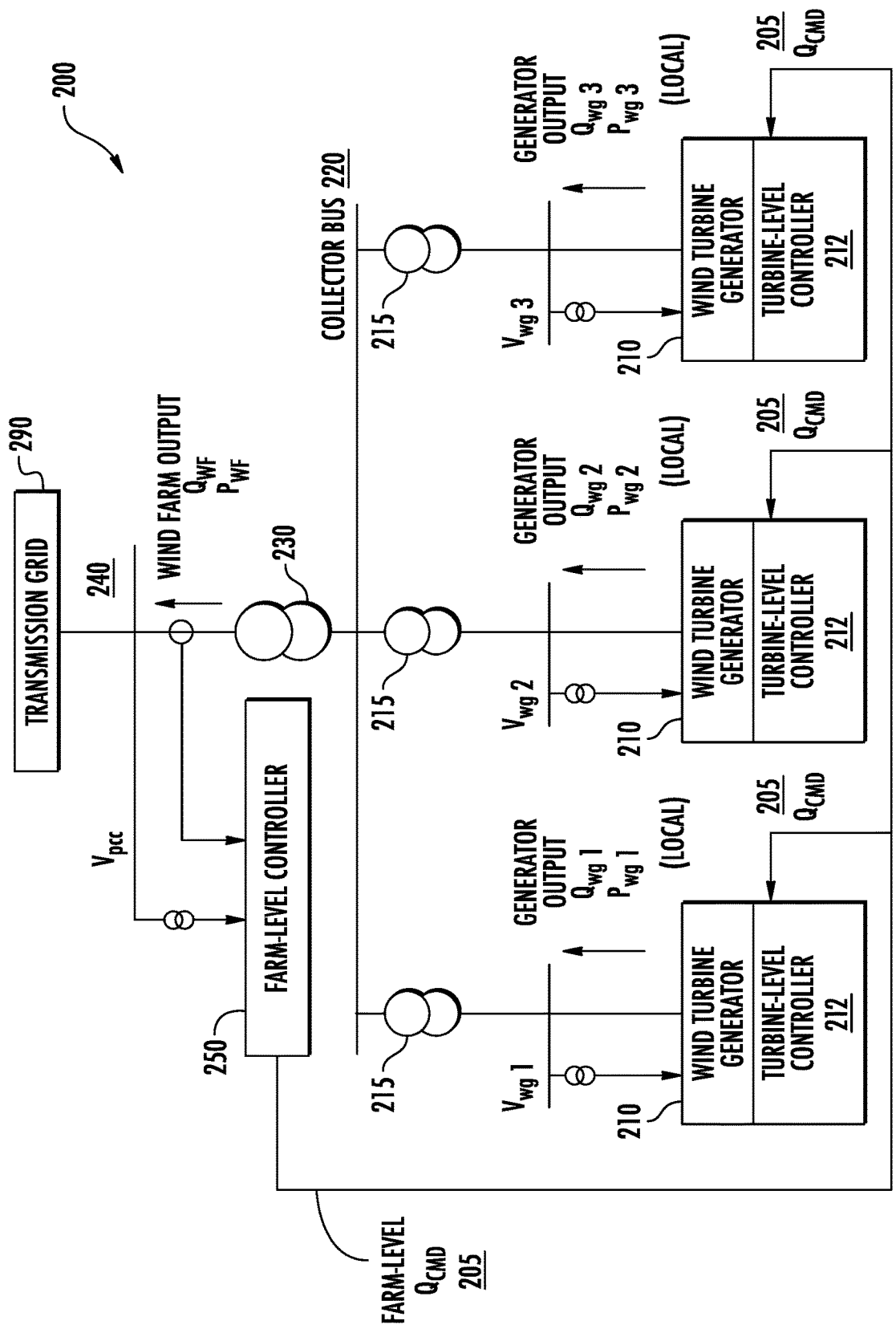
FIG. 4 illustrates a block diagram of a wind farm having multiple wind turbine generators coupled with a transmission grid according to the present disclosure.

Referring now to FIG. 2, a simplified, internal view of one embodiment of the nacelle 16 of the wind turbine 10 shown in FIG. 4 is illustrated. As shown, a generator 24 may be disposed within the nacelle 16 and supported atop a bedplate 46. In general, the generator 24 may be coupled to the rotor 18 for producing electrical power from the rotational energy generated by the rotor 18. For example, as shown in the illustrated embodiment, the rotor 18 may include a rotor shaft 34 coupled to the hub 20 for rotation therewith. The rotor shaft 34 may, in turn, be rotatably coupled to a generator shaft 36 of the generator 24 through a gearbox 38. As is generally understood, the rotor shaft 34 may provide a low speed, high torque input to the gearbox 38 in response to rotation of the rotor blades 22 and the hub 20. The gearbox 38 may then be configured to convert the low speed, high torque input to a high speed, low torque output to drive the generator shaft 36 and, thus, the generator 24.

The wind turbine 10 may also one or more pitch drive mechanisms 32 communicatively coupled to the wind turbine controller 26, with each pitch adjustment mechanism(s) 32 being configured to rotate a pitch bearing 40 and thus the individual rotor blade(s) 22 about its respective pitch axis 28. In addition, as shown, the wind turbine 10 may include one or more yaw drive mechanisms 42 configured to change the angle of the nacelle 16 relative to the wind (e.g., by engaging a yaw bearing 44 of the wind turbine 10 that is arranged between the nacelle 16 and the tower 12 of the wind turbine 10).

In addition, the wind turbine 10 may also include one or more sensors 66, 68 for monitoring various wind conditions of the wind turbine 10. For example, the incoming wind direction 52, wind speed, or any other suitable wind condition near of the wind turbine 10 may be measured, such as through use of a suitable weather sensor 66. Suitable weather sensors may include, for example, Light Detection and Ranging ("LIDAR") devices, Sonic Detection and Ranging ("SODAR") devices, anemometers, wind vanes, barometers, radar devices (such as Doppler radar devices) or any other sensing device which can provide wind directional information now known or later developed in the art. Still further sensors 68 may be utilized to measure additional operating parameters of the wind turbine 10, such as voltage, current, vibration, etc. as described herein.

Figure 3:
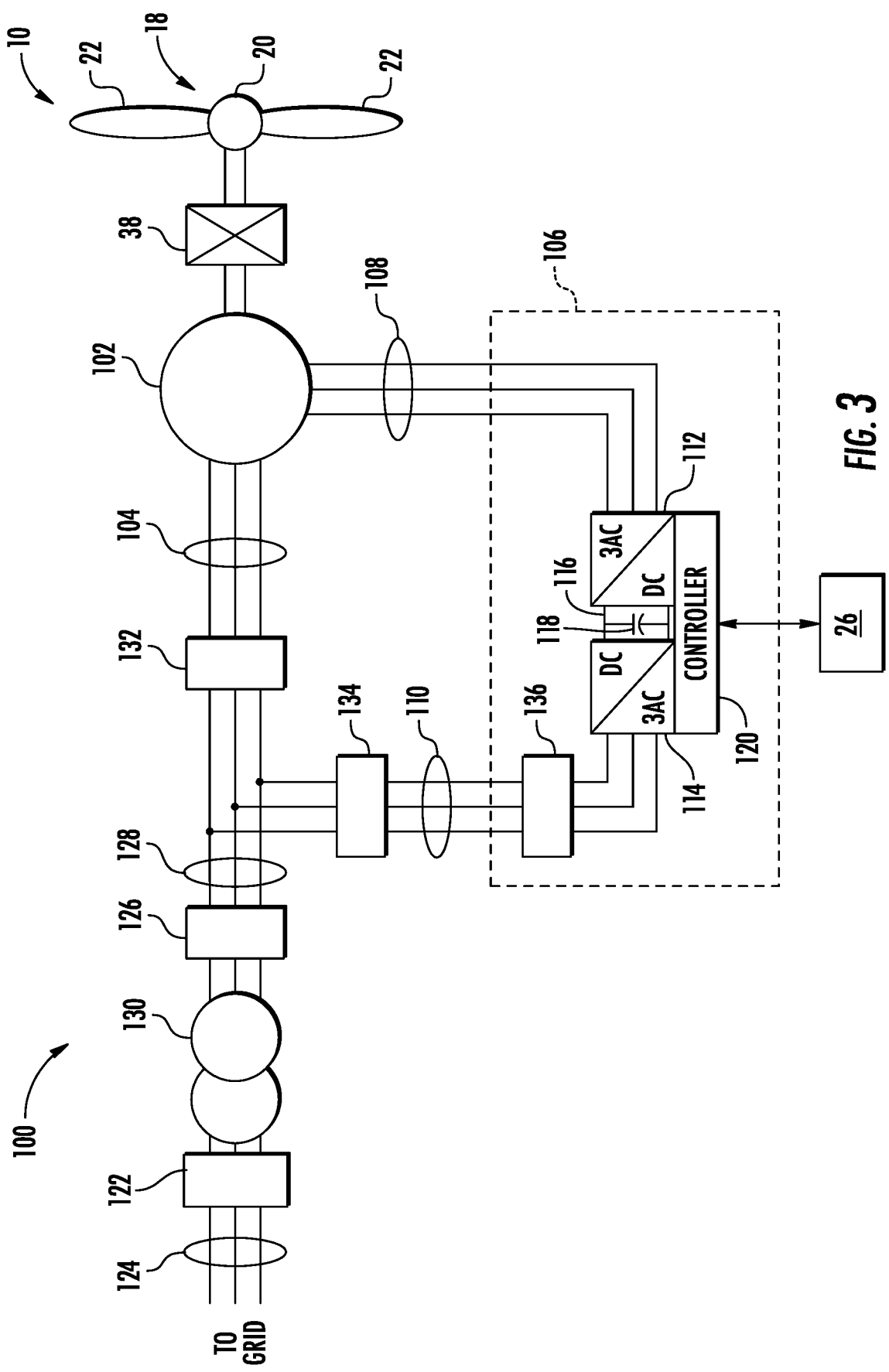
FIG. 3 illustrates a schematic view of one embodiment of a wind turbine electrical power system suitable for use with the wind turbine shown in FIG. 1.

Referring now to FIG. 3, a schematic diagram of one embodiment of a wind turbine power system 100 is illustrated in accordance with aspects of the present disclosure. Although the present disclosure will generally be described herein with reference to the wind turbine 10 shown in FIG. 1, those of ordinary skill in the art, using the disclosures provided herein, should understand that aspects of the present disclosure may also be applicable in other power generation systems, and, as mentioned above, that the invention is not limited to wind turbine systems.

In the embodiment of FIG. 3 and as mentioned, the rotor 18 of the wind turbine 10 (FIG. 4) may, optionally, be coupled to the gearbox 38, which is, in turn, coupled to a generator 102, which may be a doubly fed induction generator (DFIG). As shown, the DFIG 102 may be connected to a stator bus 104. Further, as shown, a power converter 106 may be connected to the DFIG 102 via a rotor bus 108, and to the stator bus 104 via a line side bus 110. As such, the stator bus 104 may provide an output multiphase power (e.g., three-phase power) from a stator of the DFIG 102, and the rotor bus 108 may provide an output multiphase power (e.g., three-phase power) from a rotor of the DFIG 102. The power converter 106 may also include a rotor-side converter (RSC) 112 and a line-side converter (LSC) 114. The DFIG 102 is coupled via the rotor bus 108 to the rotor-side converter 112. Additionally, the RSC 112 is coupled to the LSC 114 via a DC link 116 across which is a DC link capacitor 118. The LSC 114 is, in turn, coupled to the line side bus 110.

The RSC 112 and the LSC 114 may be configured for normal operating mode in a three-phase, pulse width modulation (PWM) arrangement using one or more switching devices, such as insulated gate bipolar transistor (IGBT) switching elements. In addition, the power converter 106 may be coupled to a converter controller 120 in order to control the operation of the rotor-side converter 112 and/or the line-side converter 114 as described herein. It should be noted that the converter controller 120 may be configured as an interface between the power converter 106 and the turbine controller 26 and may include any number of control devices.

In typical configurations, various line contactors and circuit breakers including, for example, a grid breaker 122 may also be included for isolating the various components as necessary for normal operation of the DFIG 102 during connection to and disconnection from a load, such as the electrical grid 124. For example, a system circuit breaker 126 may couple a system bus 128 to a transformer 130, which may be coupled to the electrical grid 124 via the grid breaker 122. In alternative embodiments, fuses may replace some or all of the circuit breakers.

In operation, alternating current power generated at the DFIG 102 by rotating the rotor 18 is provided to the electrical grid 124 via dual paths defined by the stator bus 104 and the rotor bus 108. On the rotor bus 108, sinusoidal multi-phase (e.g., three-phase) alternating current (AC) power is provided to the power converter 106. The rotor-side converter 112 converts the AC power provided from the rotor bus 108 into direct current (DC) power and provides the DC power to the DC link 116. As is generally understood, switching elements (e.g., IGBTs) used in the bridge circuits of the rotor-side converter 112 may be modulated to convert the AC power provided from the rotor bus 108 into DC power suitable for the DC link 116.

In addition, the line-side converter 114 converts the DC power on the DC link 116 into AC output power suitable for the electrical grid 124. In particular, switching elements (e.g., IGBTs) used in bridge circuits of the line-side converter 114 can be modulated to convert the DC power on the DC link 116 into AC power on the line side bus 110. The AC power from the power converter 106 can be constrained with the power from the stator of DFIG 102 to provide multi-phase power (e.g., three-phase power) having a frequency maintained substantially at the frequency of the electrical grid 124 (e.g., 50 Hz or 60 Hz).

Additionally, various circuit breakers and switches, such as grid breaker 122, system breaker 126, stator sync switch 132, converter breaker 134, and line contactor 136 may be included in the wind turbine power system 100 to connect or disconnect corresponding buses, for example, when current flow is excessive and may damage components of the wind turbine power system 100 or for other operational considerations. Additional protection components may also be included in the wind turbine power system 100.

Moreover, the power converter 106 may receive control signals from, for instance, the local control system 176 via the converter controller 120. The control signals may be based, among other things, on sensed states or operating characteristics of the wind turbine power system 100. Typically, the control signals provide for control of the operation of the power converter 106. For example, feedback in the form of a sensed speed of the DFIG 102 may be used to control the conversion of the output power from the rotor bus 108 to maintain a proper and balanced multi-phase (e.g., three-phase) power supply. Other feedback from other sensors may also be used by the controller(s) 120, 26 to control the power converter 106, including, for example, stator and rotor bus voltages and current feedbacks. Using the various forms of feedback information, switching control signals (e.g., gate timing commands for IGBTs), stator synchronizing control signals, and circuit breaker signals may be generated.

The power converter 106 also compensates or adjusts the frequency of the three-phase power from the rotor for changes, for example, in the wind speed at the hub 20 and the rotor blades 22. Therefore, mechanical and electrical rotor frequencies are decoupled and the electrical stator and rotor frequency matching is facilitated substantially independently of the mechanical rotor speed.

Under some states, the bi-directional characteristics of the power converter 106, and specifically, the bi-directional characteristics of the LSC 114 and RSC 112, facilitate feeding back at least some of the generated electrical power into generator rotor. More specifically, electrical power may be transmitted from the stator bus 104 to the line side bus 110 and subsequently through the line contactor 136 and into the power converter 106, specifically the LSC 114 which acts as a rectifier and rectifies the sinusoidal, three-phase AC power to DC power. The DC power is transmitted into the DC link 116. The capacitor 118 facilitates mitigating DC link voltage amplitude variations by facilitating mitigation of a DC ripple sometimes associated with three-phase AC rectification.

The DC power is subsequently transmitted to the RSC 112 that converts the DC electrical power to a three-phase, sinusoidal AC electrical power by adjusting voltages, currents, and frequencies. This conversion is monitored and controlled via the converter controller 120. The converted AC power is transmitted from the RSC 112 via the rotor bus 108 to the generator rotor. In this manner, generator reactive power control is facilitated by controlling rotor current and voltage.

Referring now to the drawings, FIG. 4 illustrates a block diagram of a wind farm 200 having a plurality of wind turbine generators 210 coupled with a transmission grid 190. FIG. 4 illustrates three wind generators 210; however, any number of wind generators can be included in a wind farm 200. Further, as shown, each of the wind turbine generators 210 includes a local controller 212 that is responsive to the conditions of the wind turbine generator 210 being controlled. In one embodiment, the controller for each wind turbine generator senses only the terminal voltage and current (via potential and current transformers). The sensed voltage and current are used by the local controller to provide an appropriate response to cause the wind turbine generator 210 to provide the desired reactive power.

Each wind turbine generator 210 is coupled to collector bus 220 through generator connection transformers 215 to provide real and reactive power (labeled $P_{wg}$ and $Q_{wg}$, respectively) to the collector bus 220. Generator connection transformers and collector buses are known in the art.

The wind farm 200 provides real and reactive power output (labeled $P_{wf}$ and $Q_{wf}$, respectively) via wind farm main transformer 230. The farm-level controller 250, which is communicatively coupled to the turbine-level controllers 212, senses the wind farm output, as well as the voltage at the point of common coupling (PCC) 240, to provide a Q command signal 205 ($Q_{CMD}$) that indicates desired reactive power at the generator terminals to ensure a reasonable distribution of reactive power among the wind turbines. In alternate embodiments, the Q command signal ($Q_{CMD}$) 205 may be generated as the local or operator level (indicated by the "LOCAL" lines in FIG. 4), for example in the event that the wind turbine generator(s) is in manual mode or otherwise not in communication with the wind farm-level controller 250.

Figure 5:
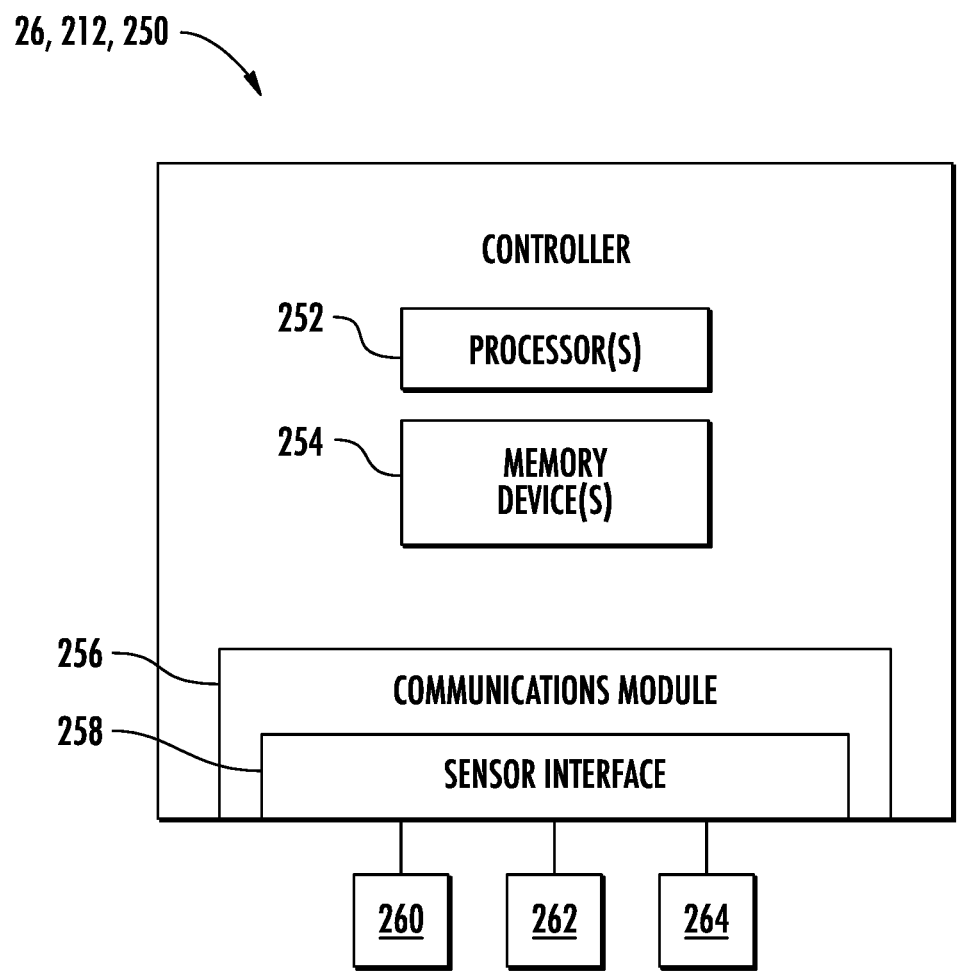
FIG. 5 illustrates a block diagram of suitable components that may be included in one embodiment of a farm-level controller according to the present disclosure.

Referring now to FIG. 5, a block diagram of one embodiment of suitable components that may be included within the turbine-level controllers 212 and/or the farm-level controller 250 in accordance with aspects of the present disclosure is illustrated. As shown, the controller 212, 250 may include one or more processor(s) 252 and associated memory device(s) 254 configured to perform a variety of computer-implemented functions (e.g., performing the methods, steps, calculations and the like and storing relevant data as disclosed herein). Additionally, the controller 212, 250 may also include a communications module 256 to facilitate communications between the controller 212, 250 and the various components of the wind farm 200. Further, the communications module 256 may include a sensor interface 258 (e.g., one or more analog-to-digital converters) to permit signals transmitted from one or more sensors 260, 262, 264 to be converted into signals that can be understood and processed by the processors 252. It should be appreciated that the sensors 260, 262, 264 may be communicatively coupled to the communications module 256 using any suitable means. For example, as shown, the sensors 260, 262, 264 are coupled to the sensor interface 258 via a wired connection. However, in other embodiments, the sensors 260, 262, 264 may be coupled to the sensor interface 258 via a wireless connection, such as by using any suitable wireless communications protocol known in the art.

As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 254 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 254 may generally be configured to store suitable computer-readable instructions that, when implemented by the processor(s) 252, configure the controller 212, 250 to perform various functions as described herein.

The sensors 260, 262, 264 may include any suitable sensors configured to provide feedback measurements to the farm-level controller 250. In various embodiments, for example, the sensors 260, 262, 264 may be any one of or combination of the following: voltage sensors, current sensors, and/or any other suitable sensors.

Figure 6:
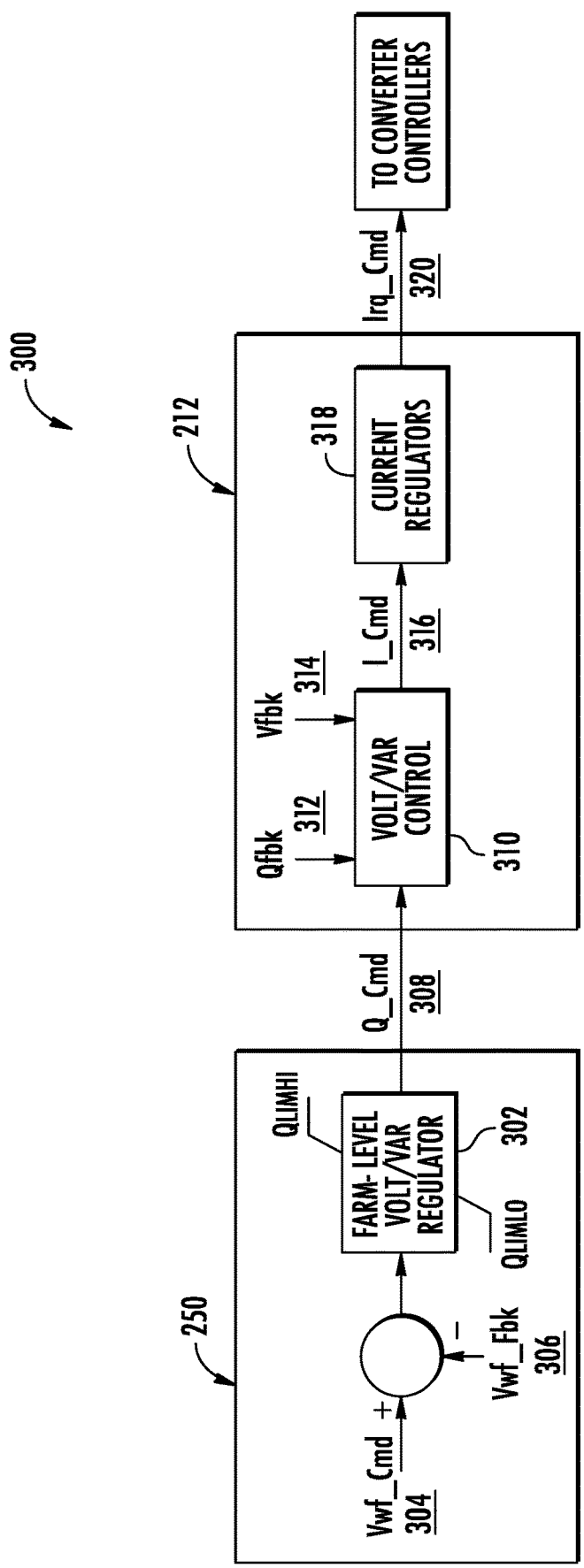
FIG. 6 illustrates a functional diagram of one embodiment of farm-level and turbine-level regulators according to the present disclosure.
Figure 7:
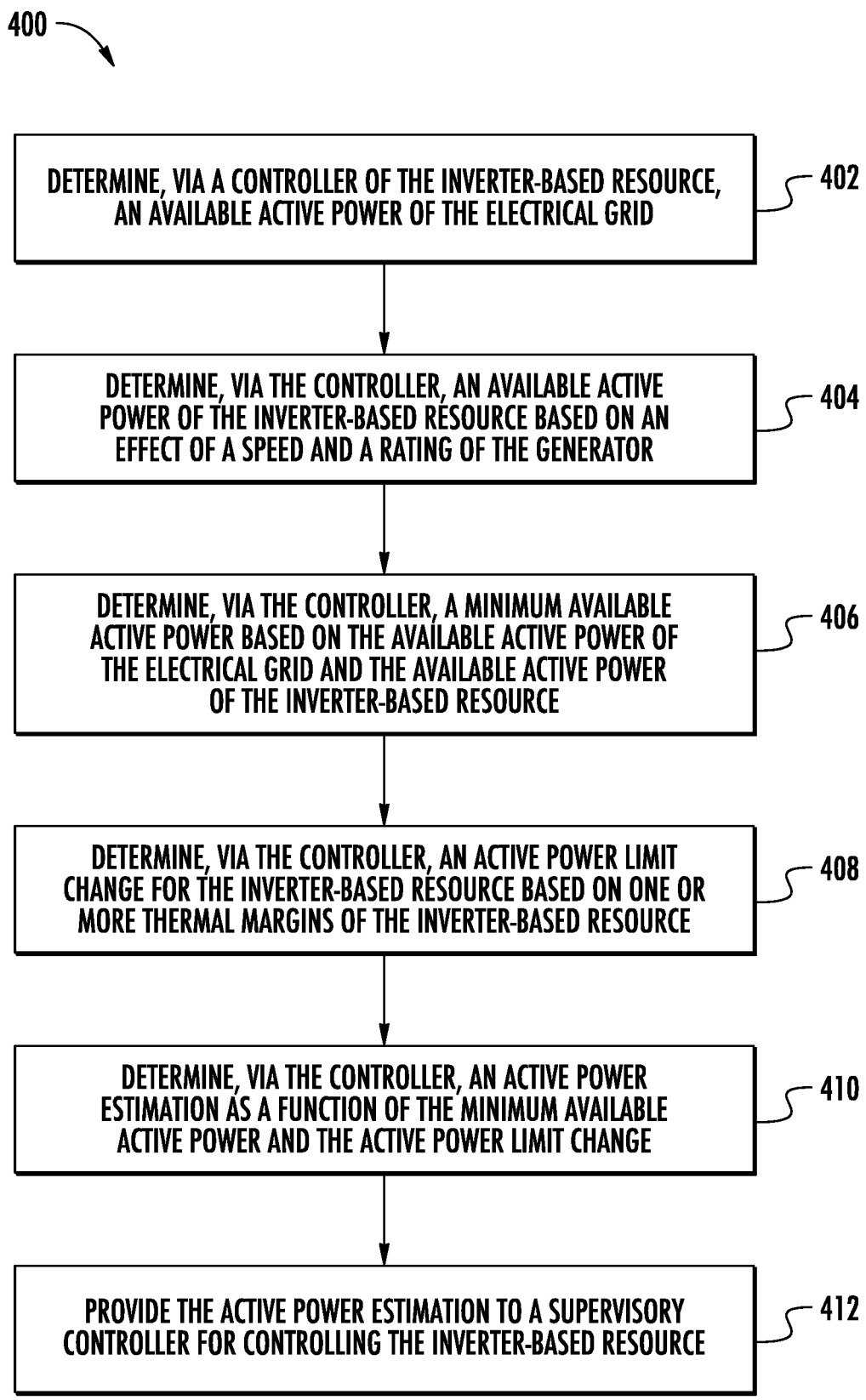
FIG. 7 illustrates a flow diagram of one embodiment of a method for controlling an inverter-based resource connected to an electrical grid according to the present disclosure.
Figure 8:
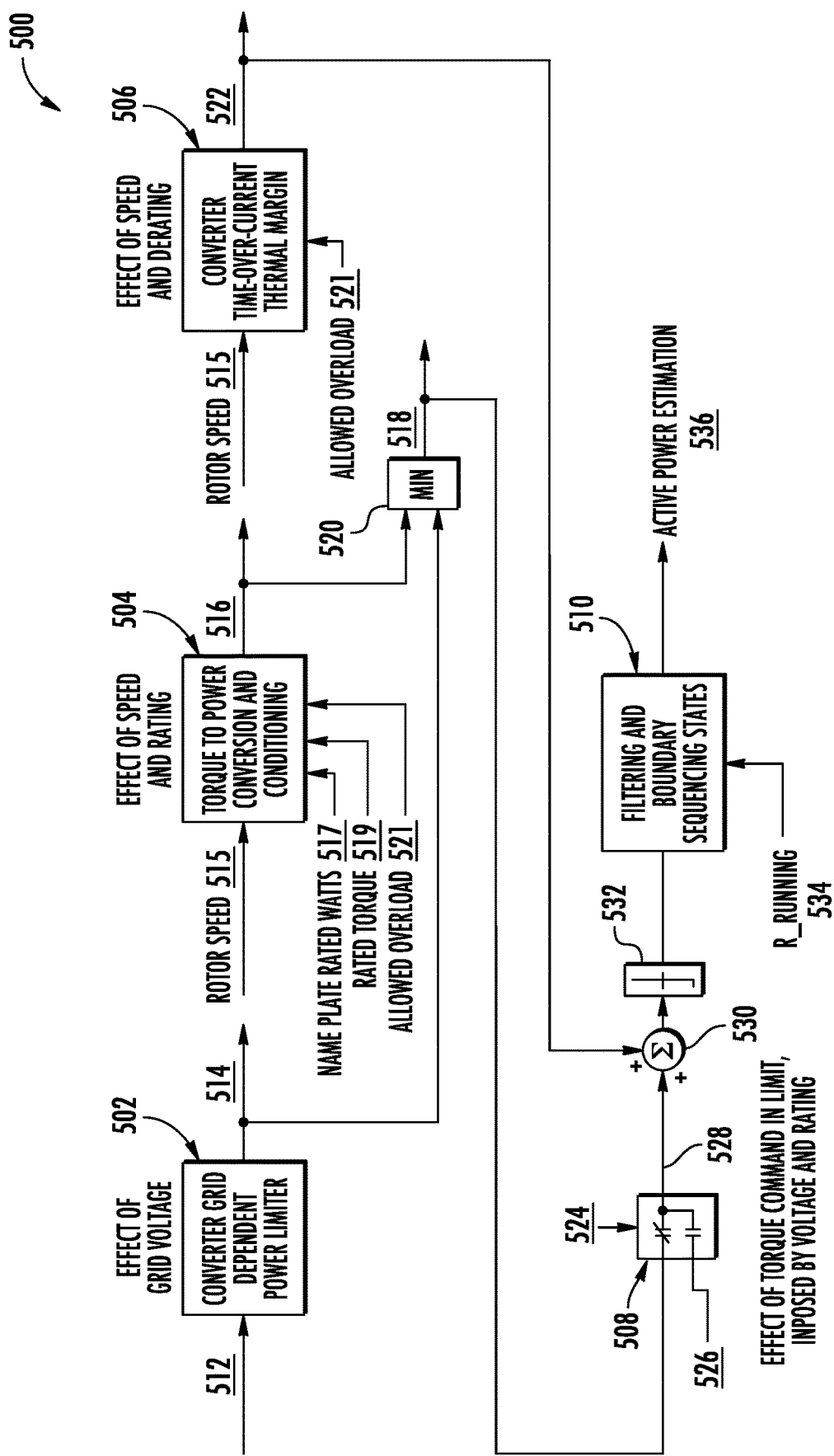
FIG. 8 illustrates a functional diagram of one embodiment of a system for controlling an inverter-based resource connected to an electrical grid according to the present disclosure.

Referring now to FIGS. 6-8, embodiments of various systems and methods for controlling a power plant, such as a wind farm, according to the present disclosure are illustrated. In particular, FIG. 6 illustrates a functional diagram of one embodiment of a system 300 having a supervisory controller (e.g., such as farm-level controller 250) and the turbine-level controllers 212 according to the present disclosure. FIG. 7 illustrates a flow diagram of one embodiment of a method 400 for controlling an inverter-based resource connected to an electrical grid, such as wind turbine, according to the present disclosure. FIG. 8 illustrates a functional diagram of an embodiment of the turbine-level controllers 212 according to the present disclosure.

Referring particularly to FIG. 6, a practical implementation of the system 300 for controlling the wind farm 200 is illustrated. In particular, as shown, the farm-level controller 250 may include a volt-var regulator 302 with upper and lower limits (e.g., $Q_{LIMHI}$ and $Q_{LIMLO}$). More specifically, as shown, the farm-level controller 250 is configured to receive one or more voltage commands of the wind farm 200 (e.g., Vwf_Cmd 304) and one or more voltage feedbacks of the wind farm 200 (e.g., Vwf_Fbk 306) that may be used by the farm-level volt-var regulator 302 for determining a reactive power command signal (e.g., Q_Cmd 308) for the turbine-level controllers 212. Moreover, as shown, each of the turbine-level controllers 212 receives the reactive power command signal 308 (i.e., via their respective turbine-level volt-var regulators 310). Thus, as shown, the turbine-level volt-var regulators 310 also receive various other parameters, such as reactive power feedbacks (e.g., QFbk 312) and voltage feedbacks (e.g., VFbk 314) of the individual wind turbines, to determine current commands (e.g., I_Cmd 316) for their respective current regulators 318. Thus, the current regulators 318 of the individual wind turbines are configured for generating a rotor current command (e.g., Irq_Cmd) 320 for the converter controller 120 of the power converter 106.

Referring now to FIG. 7, the method 400 described herein generally applies to controlling an inverter-based resource, such as wind turbine 10, which may be part of a power plant having a plurality of inverter-based resources, such as wind farm 200 described herein with respect to FIGS. 4 and 6. Thus, in such embodiments, the power plant (e.g., the wind farm 200) may be controlled by a supervisory controller (e.g., farm-level controller 250). However, it should be appreciated that the disclosed method 400 may be implemented using any other inverter-based resource that is configured to supply reactive power for application to a load, such as a power grid, such as a solar power system, a hydropower system, an energy storage power system, or combinations thereof. Further, FIG. 7 depicts steps performed in a particular order for purposes of illustration and discussion. Those of ordinary skill in the art, using the disclosures provided herein, will understand that various steps of any of the methods disclosed herein can be adapted, omitted, rearranged, or expanded in various ways without deviating from the scope of the present disclosure.

As shown at (402), the method 400 includes determining, via a controller of the inverter-based resource, an available active power of the electrical grid. As shown at (404), the method 400 includes determining, via the controller, an available active power of the inverter-based resource based on an effect of a speed and a rating of the generator. As shown at (406), the method 400 includes determining, via the controller, a minimum available active power based on the available active power of the electrical grid and the available active power of the inverter-based resource. As shown at (408), the method 400 includes determining, via the controller, an active power limit change for the inverter-based resource based on one or more thermal margins of the inverter-based resource. As shown at (410), the method 400 includes determining, via the controller, an active power estimation as a function of the minimum available active power and the active power limit change. As shown at (412), the method 400 includes providing the active power estimation to a supervisory controller for controlling the inverter-based resource.

Figure 9:
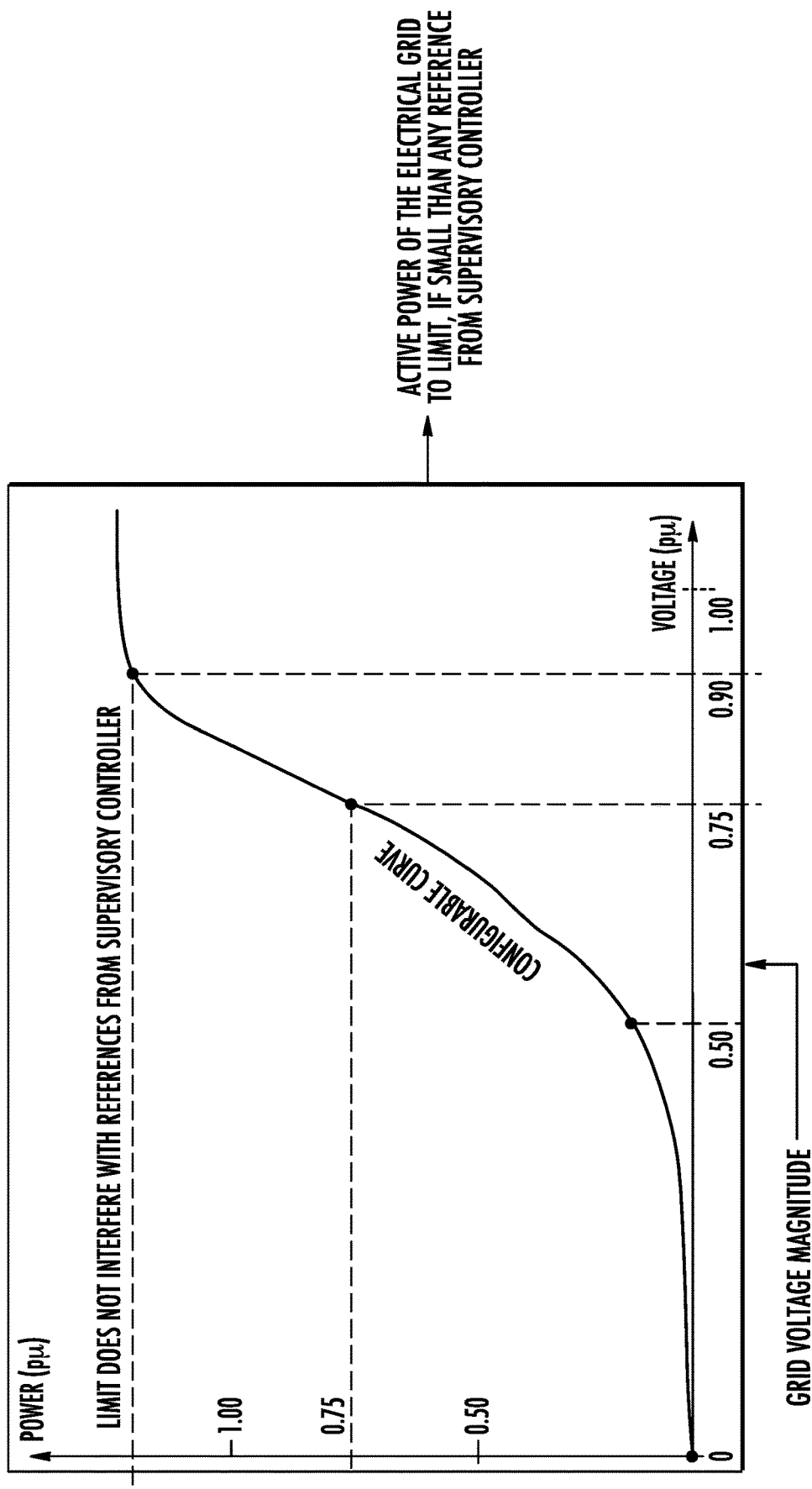
FIG. 9 illustrates a functional diagram of one embodiment of a grid dependent power limiter of a system for controlling an inverter-based resource connected to an electrical grid according to the present disclosure.
Figure 10:
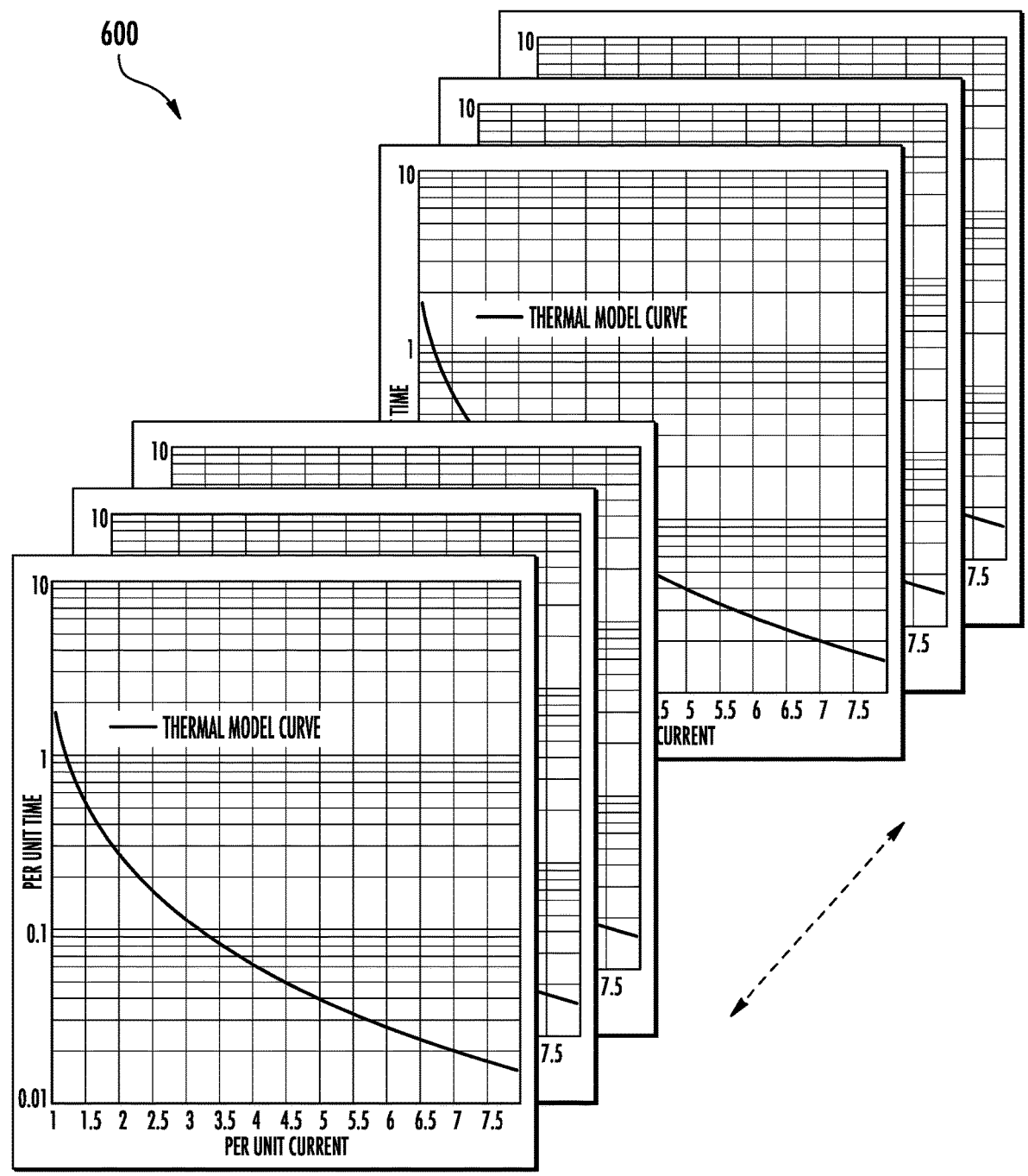
FIG. 10 illustrates a graph of an embodiment of a curve of per unit time (y-axis) versus per unit current (x-axis) according to the present disclosure.

The method 400 of FIG. 7 can be better understood with reference to the system 500 illustrated in FIGS. 8-10. In particular, aa shown, the system 500 may include a plurality of computer modules that may be part of a controller (such as any of the controllers 26, 212, 250 described herein), such as any one or more of the following: a converter grid dependent power limiter module 502, a torque-to-power conversion and conditioning module 504, a converter time-over-current thermal margin module 506, a torque limiter module 508, and/or a filtering assembly 510 (e.g., filtering and boundary sequencing states module).

Thus, as shown in FIGS. 8 and 9, the converter grid dependent power limiter module 502 is configured to receive a voltage magnitude 512 from the electrical grid and apply a power limiter to the voltage magnitude 512 to determine the available active power 514 of the electrical grid. In particular embodiments, as shown in FIG. 9, the converter grid dependent power limiter module 502 may include a piecewise function constructed of adjustable straight line sections. Thus, as shown, the converter grid dependent power limiter module 502 receives the grid voltage magnitude 512 and determines a maximum active power limit 514 as the output. In an embodiment, for example, power production is the product of voltage and current. Thus, as shown, if grid voltage changes, current also adjusts within allowed limits, to maintain the same level of power or at least maximum possible power level.

Accordingly, this function is responsible for reducing active power flow when grid conditions, such as voltage magnitude, are not favorable, and wind turbine capacity should be used for reactive power production instead. Under normal steady state operating conditions, the grid dependent power limiter 502 has almost no effect in the estimation of the active power capacity as described herein. However, during transient low voltage conditions, the grid dependent power limiter 502 becomes a predominant driver in the control logic. A misconfiguration or intentional custom configuration in the grid dependent power limiter 502 could also result in steady low active power capability.

Acknowledgment of the dependency between active power production and actual mechanical speed is also part of the dynamic active power estimation. Accordingly, and referring back to FIG. 8, the torque-to-power conversion and conditioning module 504 is configured to determine the available active power 516 of the inverter-based resource based on the effect of at least one of the speed and the rating of the generator 102. In particular, as shown, the torque-to-power conversion and conditioning module 504 is configured to receive a plurality of operating parameters of the generator 102 relating to at least one of the speed and the rating of the generator 102 and determine the available active power 516 of the inverter-based resource as a function of the plurality of operating parameters of the generator 102. In such embodiments, as shown, the plurality of operating parameters of the generator 102 may include, for example, rotor speed 515, generator speed, a name plate rated watts 517, a rated torque 519, an allowed overload 521, or combinations thereof. In particular, in an embodiment, the torque-to-power conversion and conditioning module 504 is configured to use the expression for power (P) equal to electrical torque ($\tau$) times angular speed ($\omega$) (e.g., $P=\tau*\omega$) and apply limits to torque and power based on turbine ratings, with a certain amount of temporary overload being allowed. Thus, in an embodiment, the torque-to-power conversion and conditioning module 504 receives a torque reference that is followed under normal operation; if this torque reference were to change to a maximum allowed at present speed, the outcome is the available active power 516 of the inverter-based resource.

Referring still to FIG. 8, the system 500 is configured to determine a minimum available active power 518 based on the available active power 514 of the electrical grid and the available active power 516 of the inverter-based resource. In particular, as shown, the system 500 may receive the available active power 514 of the electrical grid and the available active power 516 of the inverter-based resource via a comparator 520 and select a lower of the available active power of the electrical grid or the available active power of the inverter-based resource.

In addition, a wind turbine can experience active power derating as thermal margins in any of the electrical system components is depleted. This commonly occurs in a highly loaded wind turbine simultaneously with high ambient temperatures. Operation at reduced levels of power (i.e., derating) then becomes necessary to maintain the wind turbine connected to the electrical grid.

Accordingly, as shown, the converter time-over-current thermal margin module 506 is configured to determine the active power limit change 522 for the inverter-based resource based on one or more thermal margins of the inverter-based resource. Thus, the amount of derating calculated by the converter time-over-current thermal margin module 506 helps to forecast reductions in available capability, soon to happen if the wind turbine is to stay online. For example, in an embodiment, the converter time-over-current thermal margin module 506 is configured to receive a plurality of operating parameters relating to at least one of the speed and derating of the generator 102, determine a time-over-current thermal margin for one or more components of the inverter-based resource using the plurality of operating parameters, and determine the active power limit change for the inverter-based resource based on the time-over-current thermal margin for the one or more components of the inverter-based resource. In such embodiments, the plurality of operating parameters may include, for example, the rotor speed 515, generator speed, an allowed overload 521, or combinations thereof.

Accordingly, the converter time-over-current thermal margin module 506 accounts for existing thermal overload protection, which is provided for different components inside power converter. In general, the module is referred to as a "time-over-current" thermal module because a curve of time as function of current is used to estimate how much time a component can withstand the heating produced by a certain current. In particular, an example curve 600 of per unit time (y-axis) versus per unit current (x-axis) is illustrated in FIG. 10. Thus, in certain embodiments, the power converter 106 uses this information to monitor how close the components thereof are to being thermally overloaded (also referred as losing thermal margin). When a single component losses all its thermal margin, the power converter 106 can send a power reduction request to the turbine controller 26, such that the wind turbine 10 can remain operational, but at lower power level while other components regain thermal margin. Accordingly, the converter time-over-current thermal margin module 506 estimates the maximum power level production, when the wind turbine 10 is operating in a thermal overload scenario.

Referring back to FIG. 8, as shown, the torque limiter module 508 is configured to determine whether a torque command of the generator 102 can be modified based on the minimum available active power 518. For example, in an embodiment, the torque limiter module 508 is configured to receive a torque command limit 524 of the generator 102 and a power feedback estimation 526 of the electrical grid and determine an effect of the torque command in limit imposed by a voltage and the rating of the generator 102. In other words, all technical aspects taken into consideration within the system 500 and described herein are changing simultaneously and interacting with each other in linear and non-linear ways, e.g., nested regulation loops. This effect is introduced in the system 500 by locking its output to current active power production, if the system 500 determines that torque reference has reached a certain dynamic maximum limit.

Further, as shown, the system 500 is configured to determine an active power estimation 536 as a function of the minimum available active power 518 and the active power limit change 522 for the inverter-based resource. The active power estimation 536 can thus be provided to the supervisory controller (e.g., the farm-level controller 250). Thus, the farm-level controller 250 can receive an active power estimation from a plurality of inverter-based resources such that the controller can tailor commands for the plurality of inverter-based resources based on the active power estimations.

In further embodiments, and still referring to FIG. 8, the output 528 from the torque limiter module 508 may be summed with the active power limit change 522 as shown at 530. The output from the summator 530 may also be limited via a limiter 532 and filtered via the filtering assembly 510. In particular, in an embodiment, the filtering assembly 510 is configured to filter the active power estimation 536. For example, in an embodiment, the filtering assembly 510 may receive an operating state (e.g., R Running 534) of a rotor bridge of the power converter 106 to indicate a status of the rotor bridge. Thus, the filtering assembly 510 can ensure the operating state is running before determining the active power estimation 536. Furthermore, the filtering provides smoothing to the signal used to determine the active power estimation 536 such that the signal does not change too rapidly.

In still additional embodiments, the system 500 is also configured to determine an apparent power estimation as a function of the active power estimation 536 and a reactive power of the inverter-based resource using, for example, Equation (1) below:

$$\text{Apparent Power} = |\text{Active Power} + j \cdot \text{Reactive Power}| = \sqrt{P^2 + Q^2} \quad \text{Equation (1)}$$

where P is active power and Q is reactive power. Assuming reactive power capability to be available per reference documents, active power capability can be derived using the systems and methods described herein.

Figure 11:
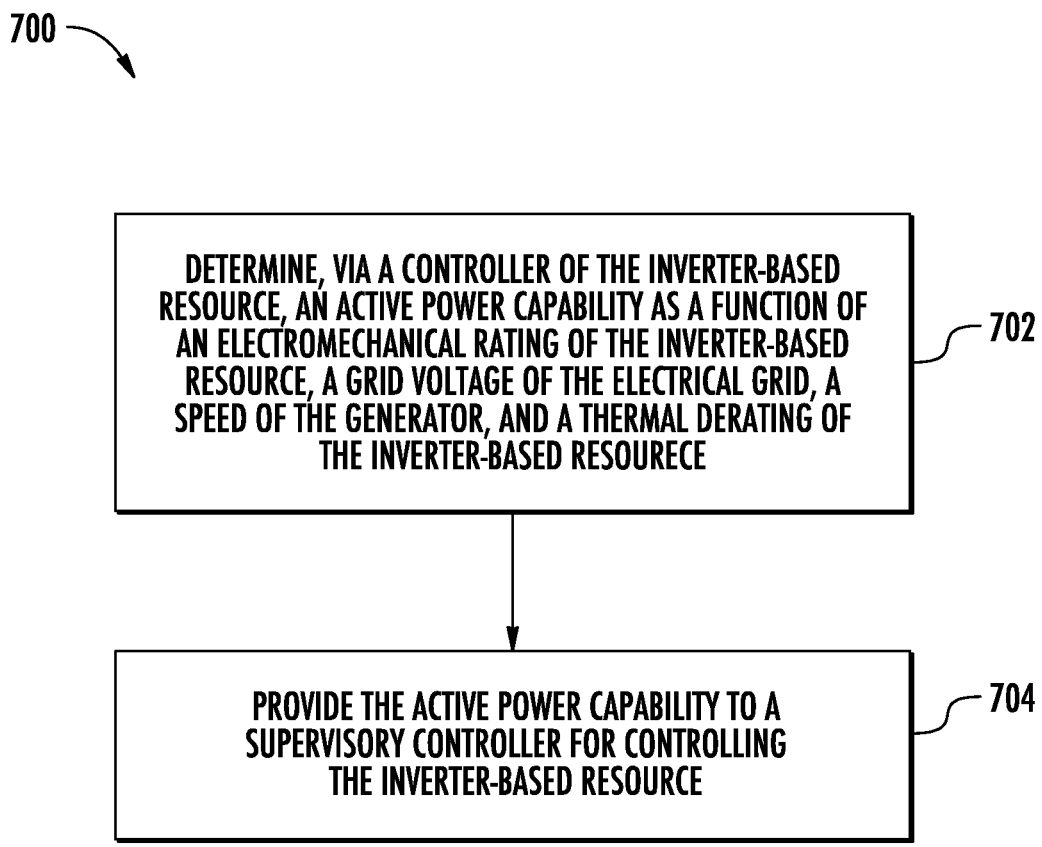
FIG. 11 illustrates a flow diagram of another embodiment of a method for controlling an inverter-based resource connected to an electrical grid according to the present disclosure.

Referring now to FIG. 11, the method 700 described herein generally applies to controlling an inverter-based resource, such as wind turbine 10, which may be part of a power plant having a plurality of inverter-based resources, such as wind farm 200 described herein with respect to FIGS. 4 and 6. Thus, in such embodiments, the power plant (e.g., the wind farm 200) may be controlled by a supervisory controller (e.g., farm-level controller 250). However, it should be appreciated that the disclosed method 700 may be implemented using any other inverter-based resource that is configured to supply reactive power for application to a load, such as a power grid, such as a solar power system, a hydropower system, an energy storage power system, or combinations thereof. Further, FIG. 11 depicts steps performed in a particular order for purposes of illustration and discussion. Those of ordinary skill in the art, using the disclosures provided herein, will understand that various steps of any of the methods disclosed herein can be adapted, omitted, rearranged, or expanded in various ways without deviating from the scope of the present disclosure.

As shown at (702), the method 700 includes determining, via a controller of the inverter-based resource, an active power capability as a function of an electromechanical rating of the inverter-based resource, a grid voltage of the electrical grid, a speed of the generator, and a thermal derating of the inverter-based resource. As shown at (704), the method 700 includes providing the active power capability to a supervisory controller for controlling the inverter-based resource.

Further aspects of the invention are provided by the subject matter of the following clauses:

1. A method for controlling an inverter-based resource connected to an electrical grid, the inverter-based resource having a generator and a power converter, the method comprising:

determining, via a controller of the inverter-based resource, an available active power of the electrical grid;

determining, via the controller, available active power of the inverter-based resource based on an effect of a speed and a rating of the generator;

determining, via the controller, a minimum available active power based on the available active power of the electrical grid and the available active power of the inverter-based resource;

determining, via the controller, an active power limit change for the inverter-based resource based on one or more thermal margins of the inverter-based resource;

determining, via the controller, an active power estimation as a function of the minimum available active power and the active power limit change; and providing the active power estimation to a supervisory controller for controlling the inverter-based resource.

2. The method of clause 1, wherein determining the available active power of the electrical grid further comprises:

receiving, via a controller of the inverter-based resource, a voltage magnitude from the electrical grid; and applying, via the controller, a power limiter to the voltage magnitude to determine an available active power of the electrical grid.

3. The method of any of the preceding clauses, wherein determining the available active power of the inverter-based resource based on the effect of at least one of the speed and the rating of the generator further comprises:

receiving, via the controller, a plurality of operating parameters of the generator relating to at least one of the speed and the rating of the generator, the plurality of operating parameters of the generator comprising one or more of a rotor speed, a generator speed, a name plate rated watts, a rated torque, or an allowed overload; and determining the available active power of the inverter-based resource as a function of the plurality of operating parameters of the generator.

4. The method of any of the preceding clauses, wherein determining the minimum available active power based on the available active power of the electrical grid and the available active power of the inverter-based resource further comprises:

receiving the available active power of the electrical grid and the available active power of the inverter-based resource via a comparator; and selecting a lower of the available active power of the electrical grid or the available active power of the inverter-based resource.

5. The method of any of the preceding clauses, wherein determining the active power limit change for the inverter-based resource based on one or more thermal margins of the inverter-based resource further comprises:

receiving, via the controller, a plurality of operating parameters relating to at least one of the speed and derating of the generator, the plurality of operating parameters comprising one or more of a rotor speed, a generator speed, or an allowed overload;

determining, via the controller, a time-over-current thermal margin for one or more components of the inverter-based resource using the plurality of operating parameters; and determining, via the controller, the active power limit change for the inverter-based resource based on the time-over-current thermal margin for the one or more components of the inverter-based resource.

6. The method of any of the preceding clauses, further comprising determining whether a torque command of the generator can be modified based on the minimum available active power.

7. The method of clause 6, wherein determining whether the torque command of the generator can be modified based on the minimum available active power further comprises:
receiving a torque command limit of the generator and a power feedback estimation of the electrical grid; and
determining, via the controller, an effect of the torque command in limit imposed by a voltage and the rating of the generator.

8. The method of any of the preceding clauses, further comprising filtering, via a filtering assembly of the controller, the active power estimation.

9. The method of clause 8, further comprising:
receiving, via the filtering assembly of the controller, an operating state of a rotor bridge of the power converter; and
ensuring the operating state is running before determining the active power estimation.

10. The method of any of the preceding clauses, wherein the inverter-based resource is part of a power plant having a plurality of inverter-based resources, the power plant being controlled by the supervisory controller.

11. The method of clause 10, wherein the inverter-based resource comprises a wind turbine and the power plant comprises a wind farm.

12. The method of clause 10, further comprising:
determining an active power estimation as a function of the minimum available active power and the active power limit change for each of the plurality of inverter-based resources;
providing the active power estimations for each of the plurality of inverter-based resources to the supervisory controller; and
tailoring, via the supervisory controller, commands the plurality of inverter-based resources based on the active power estimations.

13. The method of any of the preceding clauses, further comprising determining, via the controller, an apparent power estimation as a function of the active power estimation and a reactive power of the inverter-based resource.

14. A method for controlling an inverter-based resource connected to an electrical grid, the inverter-based resource having a generator and a power converter, the method comprising:
determining, via a controller of the inverter-based resource, an active power capability as a function of an electromechanical rating of the inverter-based resource, a grid voltage of the electrical grid, a speed of the generator, and a thermal derating of the inverter-based resource; and
providing the active power capability to a supervisory controller for controlling the inverter-based resource.

15. A system for controlling an inverter-based resource connected to an electrical grid, the inverter-based resource having a generator and a power converter, the system comprising:
a supervisory controller;
a local controller communicatively coupled to the supervisory controller, the local controller configured to perform a plurality of operations, the plurality of operations comprising:
determining an available active power of the electrical grid;
determining an available active power of the inverter-based resource based on an effect of a speed and a rating of the generator;
determining a minimum available active power based on the available active power of the electrical grid and the available active power of the inverter-based resource;
determining an active power limit change for the inverter-based resource based on one or more thermal margins of the inverter-based resource;
determining an active power estimation as a function of the minimum available active power and the active power limit change; and
providing the active power estimation to a supervisory controller for controlling the inverter-based resource.

16. The system of clause 15, wherein determining the available active power of the electrical grid further comprises:
receiving, via a controller of the inverter-based resource, a voltage magnitude from the electrical grid; and
applying, via the controller, a power limiter to the voltage magnitude to determine an available active power of the electrical grid.

17. The system of clauses 15-16, wherein determining the available active power of the inverter-based resource based on the effect of at least one of the speed and the rating of the generator further comprises:
receiving, via the controller, a plurality of operating parameters of the generator relating to at least one of the speed and the rating of the generator, the plurality of operating parameters of the generator comprising one or more of a rotor speed, a generator speed, a name plate rated watts, a rated torque, or an allowed overload; and
determining the available active power of the inverter-based resource as a function of the plurality of operating parameters of the generator.

18. The system of clauses 15-17, wherein determining the minimum available active power based on the available active power of the electrical grid and the available active power of the inverter-based resource further comprises:
receiving the available active power of the electrical grid and the available active power of the inverter-based resource via a comparator; and
selecting a lower of the available active power of the electrical grid or the available active power of the inverter-based resource.

19. The system of clauses 15-18, wherein determining the active power limit change for the inverter-based resource based on one or more thermal margins of the inverter-based resource further comprises:
receiving, via the controller, a plurality of operating parameters relating to at least one of the speed and derating of the generator, the plurality of operating parameters comprising one or more of a rotor speed, a generator speed, or an allowed overload;
determining, via the controller, a time-over-current thermal margin for one or more components of the inverter-based resource using the plurality of operating parameters; and
determining, via the controller, the active power limit change for the inverter-based resource based on the time-over-current thermal margin for the one or more components of the inverter-based resource.

20. The system of clauses 15-19, further comprising determining whether a torque command of the generator can be modified based on the minimum available active power, wherein determining whether the torque command of the generator can be modified based on the minimum available active power further comprises:
receiving a torque command limit of the generator and a power feedback estimation of the electrical grid; and
determining, via the controller, an effect of the torque command in limit imposed by a voltage and the rating of the generator.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for controlling an inverter-based resource connected to an electrical grid, the inverter-based resource having a generator and a power converter, the method comprising:
   determining, via a local controller of the inverter-based resource, an available active power of the electrical grid;
   determining, via the local controller, an available active power of the inverter-based resource based on an effect of a speed and a rating of the generator;
   determining, via the local controller, a minimum available active power based on the available active power of the electrical grid and the available active power of the inverter-based resource;
   determining, via the local controller, an active power limit change for the inverter-based resource based on one or more thermal margins of the inverter-based resource;
   determining, via the local controller, an active power estimation as a function of the minimum available active power and the active power limit change; and
   providing, via the local controller, the active power estimation to a supervisory controller for controlling the inverter-based resource.

2. The method of claim 1, wherein determining the available active power of the electrical grid further comprises:
   receiving, via the local controller of the inverter-based resource, a voltage magnitude from the electrical grid; and
   applying, via the local controller, a power limiter to the voltage magnitude to determine an available active power of the electrical grid.

3. The method of claim 1, wherein determining the available active power of the inverter-based resource based on the effect of at least one of the speed and the rating of the generator further comprises:
   receiving, via the local controller, a plurality of operating parameters of the generator relating to at least one of the speed and the rating of the generator, the plurality of operating parameters of the generator comprising one or more of a rotor speed, a generator speed, a name plate rated watts, a rated torque, or an allowed overload; and
   determining the available active power of the inverter-based resource as a function of the plurality of operating parameters of the generator.

4. The method of claim 1, wherein determining the minimum available active power based on the available active power of the electrical grid and the available active power of the inverter-based resource further comprises:
   receiving the available active power of the electrical grid and the available active power of the inverter-based resource via a comparator; and
   selecting a lower of the available active power of the electrical grid or the available active power of the inverter-based resource.

5. The method of claim 1, wherein determining the active power limit change for the inverter-based resource based on one or more thermal margins of the inverter-based resource further comprises:
   receiving, via the local controller, a plurality of operating parameters relating to at least one of the speed and derating of the generator, the plurality of operating parameters comprising one or more of a rotor speed, a generator speed, or an allowed overload;
   determining, via the local controller, a time-over-current thermal margin for one or more components of the inverter-based resource using the plurality of operating parameters; and
   determining, via the local controller, the active power limit change for the inverter-based resource based on the time-over-current thermal margin for the one or more components of the inverter-based resource.

6. The method of claim 1, further comprising determining whether a torque command of the generator can be modified based on the minimum available active power.

7. The method of claim 6, wherein determining whether the torque command of the generator can be modified based on the minimum available active power further comprises:
   receiving a torque command limit of the generator and a power feedback estimation of the electrical grid; and
   determining, via the local controller, an effect of the torque command in limit imposed by a voltage and the rating of the generator.

8. The method of claim 1, further comprising filtering, via a filtering assembly of the local controller, the active power estimation.

9. The method of claim 8, further comprising:
   receiving, via the filtering assembly of the local controller, an operating state of a rotor bridge of the power converter; and
   ensuring the operating state is running before determining the active power estimation.

10. The method of claim 1, wherein the inverter-based resource is part of a power plant having a plurality of inverter-based resources, the power plant being controlled by the supervisory controller.

11. The method of claim 10, wherein the inverter-based resource comprises a wind turbine and the power plant comprises a wind farm.

12. The method of claim 10, further comprising:
   determining an active power estimation as a function of the minimum available active power and the active power limit change for each of the plurality of inverter-based resources;
   providing the active power estimations for each of the plurality of inverter-based resources to the supervisory controller; and
   tailoring, via the supervisory controller, commands the plurality of inverter-based resources based on the active power estimations.

13. The method of claim 1, further comprising determining, via the controller, an apparent power estimation as a function of the active power estimation and a reactive power of the inverter-based resource.

14. A system for controlling an inverter-based resource connected to an electrical grid, the inverter-based resource having a generator and a power converter, the system comprising:

a supervisory controller;

a local controller communicatively coupled to the supervisory controller, the local controller configured to perform a plurality of operations, the plurality of operations comprising:

determining an available active power of the electrical grid;

determining an available active power of the inverter-based resource based on an effect of a speed and a rating of the generator;

determining a minimum available active power based on the available active power of the electrical grid and the available active power of the inverter-based resource;

determining an active power limit change for the inverter-based resource based on one or more thermal margins of the inverter-based resource;

determining an active power estimation as a function of the minimum available active power and the active power limit change; and providing the active power estimation to the supervisory controller for controlling the inverter-based resource.

15. The system of claim 14, wherein determining the available active power of the electrical grid further comprises:

receiving, via the local controller of the inverter-based resource, a voltage magnitude from the electrical grid; and applying, via the local controller, a power limiter to the voltage magnitude to determine an available active power of the electrical grid.

16. The system of claim 14, wherein determining the available active power of the inverter-based resource based on the effect of at least one of the speed and the rating of the generator further comprises:

receiving, via the local controller, a plurality of operating parameters of the generator relating to at least one of the speed and the rating of the generator, the plurality of operating parameters of the generator comprising one or more of a rotor speed, a generator speed, a name plate rated watts, a rated torque, or an allowed overload; and determining the available active power of the inverter-based resource as a function of the plurality of operating parameters of the generator.

17. The system of claim 14, wherein determining the minimum available active power based on the available active power of the electrical grid and the available active power of the inverter-based resource further comprises:

receiving the available active power of the electrical grid and the available active power of the inverter-based resource via a comparator; and selecting a lower of the available active power of the electrical grid or the available active power of the inverter-based resource.

18. The system of claim 14, wherein determining the active power limit change for the inverter-based resource based on one or more thermal margins of the inverter-based resource further comprises:

receiving, via the local controller, a plurality of operating parameters relating to at least one of the speed and derating of the generator, the plurality of operating parameters comprising one or more of a rotor speed, a generator speed, or an allowed overload;

determining, via the local controller, a time-over-current thermal margin for one or more components of the inverter-based resource using the plurality of operating parameters; and determining, via the local controller, the active power limit change for the inverter-based resource based on the time-over-current thermal margin for the one or more components of the inverter-based resource.

19. The system of claim 14, further comprising determining whether a torque command of the generator can be modified based on the minimum available active power, wherein determining whether the torque command of the generator can be modified based on the minimum available active power further comprises:

receiving a torque command limit of the generator and a power feedback estimation of the electrical grid; and determining, via the local controller, an effect of the torque command in limit imposed by a voltage and the rating of the generator.

\* \* \* \* \*